United States Patent Office 3,356,712
Patented Dec. 5, 1967

3,356,712
PROCESS FOR THE PREPARATION OF ARYL ESTERS OF CARBOCYCLIC AROMATIC CARBOXYLIC ACIDS
Gustav Renckhoff, Witten-Ruhr, and Hans Leo Hülsmann, Witten, Reudinghausen, Germany, assignors to Chemische Werke Witten G.m.b.H., Witten-Ruhr, Germany
No Drawing. Filed Feb. 12, 1963, Ser. No. 257,870
Claims priority, application Germany, July 6, 1962, C 27,396; Dec. 1, 1962, C 28,561
10 Claims. (Cl. 260—475)

The present process is directed to the preparation of aryl esters of carbocyclic aromatic carboxylic acids.

The phenyl esters of aromatic carboxylic acids have heretofore usually been prepared by the reaction of the corresponding carboxylic acid chloride with phenol in the presence of alkalis or tertiary amines. This process has serious disadvantages which reside in that the acid chlorides are difficult to manipulate because of the high reactivity and strong corrosion effect thereof, and in that the manufacture and purification thereof requires correspondingly corrosion-resistant, expensive apparatus.

The same holds true for a modification of this process wherein the aromatic carboxylic acids are heated with phenol in the presence of acid chloride-forming substances, such as phosphorus pentachloride, phosphorus oxychloride, or thionyl chloride, whereby the phenyl ester is produced with cleavage of hydrogen chloride.

The direct esterification of the carboxylic acids with phenol in the presence of large amounts of water-absorbing agents, such as phosphorus pentoxide or polyphosphoric acids, has also been already proposed; it proceeds, however, mostly with low yields and leads to impure products which can be purified only in a cumbersome or complicated manner.

The German patent 1,115,252 describes a process for the preparation of carboxylic acid aryl esters by the reaction of the carboxylic acids with diaryl carbonates in the presence of catalysts; yet this process is also cumbersome since the diaryl carbonates have to be produced first with the aid of phosgene.

It has now been found in accordance with the present invention that aryl, and particularly the phenyl, esters of carbocyclic aromatic mono- and polycarboxylic acids may be prepared in a particularly simple and advantageous manner if the methyl esters of these carboxylic acids are heated with a phenolic component in the presence of transesterification catalysts to temperatures above 160° C. and the methyl alcohol is continuously removed from the reaction mixture.

The reaction is carried out preferably at temperatures of from 180° to 250° C. When low-boiling carboxylic acid esters are used as the starting material, it may be necessary to work under a slight excess pressure. Below 160° C., the reaction takes place immeasurably slowly. The upper temperature limit is not critical and is determined by the thermal stability of the respective starting material and considerations of economics.

Also, other aryl esters of carbocyclic aromatic mono- and polycarboxylic acids may be obtained when, in the transesterification reaction, the phenol is entirely, or partially, exchanged by phenols and/or naphthols substituted by one or several alkyl- and/or aralkyl radicals.

As the phenolic component in the present invention, for example, the isomeric cresols or xylenols, butyl-phenols, octylphenols, benzylphenols, β-naphthol, etc., may be mentioned. When using phenol mixtures, mixed aryl esters are obtained which are of interest for some intended uses because of their low melting point.

As transesterification catalysts, those acid or alkaline substances which are known as such may be employed, for example, polyphosphoric acid, alkali hydroxides, butyl titanate, etc. Such catalysts are well known in the art and are described, for example, in J. Polymer Science, Volume 54, pages 388–389 (1961). Particularly advantageous is the behavior of the fatty acid salts of the metals of the second group of the Periodic System, such as, for instance, calcium stearate, or the zinc salt of preliminary run coconut fatty acids, since they dissolve well in the reaction mixture and do not exert thereon any decomposing or disintegrating effect. Very effective also are tin compounds, particularly fatty acid salt thereof, for example, tin stearate.

As starting materials for the process in accordance with the present invention, the methyl esters of the carbocyclic aromatic mono- and polycarboxylic acids and their nuclear-substitution products, for example, benzoic acid methyl ester, the methyl esters of the isomeric toluic acids, and the aromatic di- and polycarboxylic acids esterified with methanol either completely or partially, such as, for example, terephthalic acid, isophthalic acid, diphenyl dicarboxylic acids, diphenyl methane dicarboxylic acids, benzophenonedicarboxylic acids, trimellitic acid, pyromellitic acid, naphthalene dicarboxylic acids, and the like, are usable.

The phenolic component is employed at least in an equivalent amount based on the amount of methyl ester of the carboxylic acid which is to be utilized in accordance with the present invention—and suitably in excess, preferably 2 to 6 mol of phenol per equivalent of methyl ester, in order to expedite the reaction. The excess phenol used may be easily removed by distillation upon the completion of the reaction.

When employing the methyl esters of the di- and polycarboxylic acids, the reaction may also be conducted in such a manner that mixed methyl-phenyl esters are yielded as the principal products. These may be separated from the diphenyl esters formed and possibly the unreacted starting material without difficulty by distillation or by crystallization, since the boiling points and solubility properties vary in most instances. The methyl-phenyl esters of iso- and terephthalic acid may thus be obtained particularly advantageously when the reaction is so directed that equivalent amounts of phenol, or only a slight excess, are used and the reaction mixture is heated until 1 mol of methanol per mol of dimethyl ester used has been cleaved off. By distillation of the reaction mixture, the methyl-phenyl esters may be easily obtained therefrom in a completely pure condition.

These mixed esters are especially valuable for the preparation of ester amides because of the differentiated reactivity of the methyl and phenyl ester group with regard to amines.

The carboxylic acid aryl esters possess technical significance as softeners and as intermediate products for organic syntheses. The dicarboxylic acid diaryl esters are particularly valuable intermediate stages for polycondensation products.

The following examples serve to further illustrate the present invention without limiting the same.

Example 1

372 parts by weight of benzoic acid methyl ester (about 2.7 mol) are heated while stirring with 338 parts by weight of phenol (about 3.6 mol) and 14.2 parts by weight of preliminary-run-fatty-acid zinc (about 2 percent by weight of the initial weight) as catalyst in a flask equipped with fractionating column, while a nitrogen stream of 1,300 vol.-parts/min. is passed through the apparatus. The escaping gas stream passes a descending cooler and a cooling trap kept at −50° C. The sump temperature rises during the transesterification reaction constantly from 184 to 203° C. The methanol formed during the transesterification is distilled off at temperatures up to a maximum of 70° C. at the top of the column. After 29 hours, the batch is distilled in vacuo. After distillation of the unreacted phenol and benzoic acid methyl ester, 364.1 parts by weight of benzoic acid phenyl ester pass over at 178° C. and 18 torr. The phenyl ester melts between 70 and 70.5° C. The acid number of the ester is 0 and the saponification number is 284 (calculated as 283).

When taking into account the benzoic acid methyl ester which was recovered (120 parts by weight), the yield of benzoic acid phenyl ester is 99.2% of the theoretical.

*Example II*

750 parts by weight of dimethyl terephthalate (about 3.9 mol) are heated while stirring with 730 parts by weight of phenol (about 7.8 mol) and 37.5 g. of preliminary-run-fatty-acid zinc (about 2.5 percent by weight of the initial weight) as catalyst in a flask equipped with fractionating column, while a nitrogen stream of 1,300 vol.-parts/min. is passed through the apparatus. The escaping gas stream passes a descending cooler and a cooling trap kept at −50° C. The sump temperature rises, during the transesterification, constantly from 192° C. to 220° C. The methanol formed during the course of the reaction is distilled off at temperatures up to a maximum of 64° C. at the top of the column. After 10 hours, the batch is distilled in vacuo. After distillation of the unreacted phenol and dimethyl terephthalate, 466 parts by weight of pure methyl-phenyl-terephthalate pass over between 215–230° C. at 11 torr. The ester melts at 109–110° C. Its acid number is 0.9, the saponification number 439 (calculated as 437). 408 parts by weight of diphenyl terephthalate remain after distillation of the methyl-phenyl-terephthalate. They are again utilized during the transesterification described hereinbelow.

When taking into account the recovered dimethyl terephthalate (133 parts by weight), the yield of methyl-phenyl-terephthalate amounts to 57% of the theoretical; the yield of diphenyl terephthalate is 40.5% of the theoretical, based on the amount of transesterified dimethyl terephthalate.

The distillation residue (445.5 parts by weight) containing 408 parts by weight of diphenyl terephthalate is heated in the same manner with 527 parts by weight of terephthalic acid dimethyl ester and 517 parts by weight of phenol (molar ratio about 1:2) for 10 hours to 198–215° C. with distillation of the freed methanol. Then the batch is distilled in vacuo. After distillation of the unreacted phenol and dimethyl terephthalate, 525 grams of pure methyl-phenyl-terephthalate are obtained which pass over between 214–230° C./11 torr. The melting point of the ester is 109–110° C.; the acid number is 1; and the saponification number 436 (calculated as 437).

363 parts by weight of diphenyl terephthalate remain after distillation of the methyl-phenyl-terephthalate.

When taking into account the dimethyl terephthalate (152 parts by weight) and diphenyl terephthalate returned unchanged, the yield of methyl-phenyl-terephthalate is 98.5% of the theoretical, based on the amount of dimethyl- and diphenyl-terephthalate reacted.

*Example III*

750 parts by weight of dimethyl isophthalate (about 3.9 mol) are heated with 1,095 parts by weight of phenol (about 11.7 mol) and 46 parts by weight of preliminary-run-fatty-acid zinc (about 2.5% by weight of the initial weight) under the conditions indicated in Example II to 190–200° C. while distilling off the methanol freed during the reaction, whereby the temperature at the top of the fractionating column does not exceed 80° C. After 33 hours, the batch is distilled in vacuo. After distillation of the unreacted phenol and dimethyl isophthalate, 185 parts by weight of methyl-phenyl-isophthalate pass over at between 210–225° C. at 16 torr. The melting point thereof is 81° C. The saponification number is 438 (calculated as 437). 647 parts by weight of diphenyl isophthalate distill between 260–272° C. and 16 torr. The melting point, after recrystallization from xylene, is 137° C., and the saponification number is 353 (calculated as 353).

When taking into account the dimethyl isophthalate recovered (195 parts by weight), the yield of methyl-phenyl-isophthalate is 25.3%, and of diphenyl isophthalate 71.2% of the theoretical.

*Example IV*

624 parts by weight of methylterephthalic acid dimethyl ester (about 3 mol) are transesterified with 842 parts by weight of phenol (about 9 mol) with the addition of 7.2 parts by weight of zinc salt of preliminary run coconut fatty acids as catalyst, as described in Example II. During the course of the reaction, the temperature in the flask rises from 182 to 195° C. After 34 hours, the unreacted phenol is distilled off. During the subsequent vacuum distillation, the following fractions are obtained: 44 parts by weight of methylterephthalic acid dimethyl ester which boils between 120 and 148° C. at 0.6 torr; 242.5 parts by weight of methylterephthalic acid methyl phenyl ester with the boiling interval of 178 to 202° C. at 0.6 torr; acid number: 0.9; saponification number: 414 (calculated as 417), melting point 56 to 56.5° C.; and 622.5 parts by weight of methylterephthalic acid diphenyl ester with the boiling interval of 205 to 225° C. at 0.15 to 0.2 torr; acid number: 0.9; saponification number: 340 (calculated as 338), melting point 146° C. When taking into account the recovered dimethyl ester, the yield of methyl-phenyl ester of the methylterephthalic acid amounts to 32.4% of the theoretical and of diphenyl ester to 67.2% of the theoretical.

*Example V*

263 parts by weight of 2,5 - dichloroterephthalic acid dimethyl ester (about 1 mol) are transesterified with 100 parts by weight of phenol with the addition of 2.6 parts by weight of tin stearate (1%, based on the amount of dichloro-DMT), as described above. During the transesterification, another 150 parts by weight of phenol are added by portions in such a manner that the reaction temperature does not decrease to below 220° C. The calculated amount of methanol is separated after 31 hours. After distillation of the excess phenol, there remain 386.8 parts by weight of 2,5 - dichloroterephthalic acid diphenyl ester, corresponding to 99.9% of the theoretical yield. After recrystallization from xylene, the ester melts at 175.5 to 176° C. The saponification number is 289 (calculated as 289); the percentage of Cl is 18.4 (calculated as 18.3).

*Example VI*

215 parts by weight of α - naphthoic acid methyl ester (1.15 mol) are transesterified with 216 parts by weight of phenol (2.3 mol) with the addition of 2.15 parts by weight of zinc stearate (1%, based on the amount of α-naphthoic acid methyl ester) at temperatures of from 180 to 205° C. with distillation of the separated methanol. The unreacted phenol is distilled off after 42 hours. 41 parts by weight of α - naphthoic acid methyl ester then distill at 164 to 203° C. at 14 torr and 185 parts by weight of α - naphthoic acid phenyl ester at 233 to 239° C. at 14 torr. The acid number is 0.7 and the saponification number is 227 (calculated as 226). After recrystallization of the ester from ethanol, the melting point is 95.5 to 96.0° C. The yield of α - naphthoic acid phenyl ester amounts to 80% of the theoretical, based on the amount of α - naphthoic acid methyl ester reacted.

*Example VII*

134 parts by weight of 4,4′ - diphenyldicarboxylic acid dimethyl ester (0.495 mol) are heated to 185° C. for 24 hours with 470 parts by weight of phenol (5 mol) with the addition of 6 parts by weight of tin stearate as catalyst, whereby methanol distills off at the top of the column. Fractional crystallization of the transesterification product from benzene, which remains after distillation of the phenol, results in 71 parts by weight of 4,4'-diphenyldicarboxylic acid diphenyl ester, corresponding to 36.3% of the theoretical yield. The acid number is 0; the saponification number is 283.5 (calculated as 284), and the melting point is 215° C. Also obtained are 68.5 parts by weight of 4,4'-diphenyldicarboxylic acid methyl phenyl ester, corresponding to 41.6% of the theoretical yield; the acid number thereof is 0.9, the saponification number is 324 (calculated as 337), and the melting point is 139 to 141° C.

*Example VIII*

300 parts by weight of p-toluic acid methyl ester (2 mol) and 376 parts by weight of phenol (4 mol) are transesterified with the addition of 1.5 parts by weight of tin stearate as catalyst for 30 hours. The temperature in the reaction flask rises thereby from initially 190 to about 220° C. After distillation of the excess phenol and a small amount (22 parts by weight) of unreacted p-toluic acid ester, 381 parts by weight of p-toluic acid phenyl ester are obtained, having a melting point of 66 to 67° C. Saponification number: 266 (calculated as 265). This corresponds to an exchange of 90% of the toluic ester employed and, respectively, to a yield of 97%, based on the amount of toluic acid ester reacted.

*Example IX*

378 parts by weight of trimellitic acid trimethyl ester (about 1.5 mol) are transesterified with 235 parts by weight of phenol (about 2.5 mol) with the addition of 3.78 parts by weight of butyl titanate (1%, based on the amount of TMT). During the course of 4½ hours, the temperature in the flask rises to 250° C. During the distillation, 82.5 parts by weight of phenol are recovered. 131 parts by weight of trimellitic acid trimethyl ester then distill at 162 to 198° C. at 0.5 to 0.7 torr and, at 200 to 240° C. at 0.6 to 0.7 torr, 104.5 parts by weight of trimellitic acid dimethyl phenyl ester distill. The distillation residue (230 parts by weight) may be purified by recrystallization from xylene. It consists of 31.5% by weight of trimellitic acid monomethyl-diphenyl ester and 68.5% by weight of trimellitic acid triphenyl ester. When taking into account the trimethyl ester recovered, the yield of phenyl esters amounts to about 88% of the theoretical.

*Example X*

256 parts by weight of dimethylterephthalate (1.33 mol) are heated, while stirring in a flask provided with fractionating column, with 358 parts by weight (3.3 mol) of freshly distilled p-cresol with the addition of 1.28 parts by weight of zinc stearate (0.5% based on the amount of dimethyl terephthalate) in such a manner that only methanol distills off at the top of the column. During the transesterification, a slow nitrogen stream is passed through the apparatus. The temperature in the flask rises from initially about 200° C. to about 235° C. at the end of the transesterification. After 20 hours, 80.5 parts by weight of methanol (95% of the theoretical amount) have distilled off. When reworking the reaction batch by distillation, 72 parts by weight of p-cresol are first obtained. Thereupon, 3 parts by weight of unreacted dimethyl terephthalate distill at 20 torr from 120 to 160° C. and subsequently, 45.5 parts by weight of methyl-p-cresyl terephthalate at 245 to 285° C. Thereafter, the di-p-cresyl terephthalate is distilled over at 1 torr at 250° C. 337.5 parts by weight are thereby obtained, corresponding to 76% of the theoretical yield, based on the amount of dimethyl terephthalate employed. The melting point after recrystallization from xylene is 199–200° C. The saponification number is 328; the acid number is 1.3.

*Example XI*

300 parts by weight (2 mol) of p-toluic acid methyl ester and 432 parts by weight (4 mol) of m-cresol are transesterified with the addition of 1.5 parts by weight of tin stearate (0.5%, based on the amount of p-toluic acid ester), as described in Example I. The temperature in the reaction flask rises thereby gradually from an initial 200° C. to about 230° C. After 25 hours, the methanol cleavage is completed and 90% of the calculated methanol amount is condensed in the receiver. After distillation of the excess cresol and a small amount of unreacted p-toluic acid ester, which may be returned into a new batch, 385 parts by weight of pure p-toluic acid-m-cresyl ester are obtained having a boiling point of 196 to 198° C. at 18 torr. This corresponds to a theoretical yield of 85%, based on the amount of p-toluic acid ester employed and, respectively, to 97% based on the amount of ester reacted. The cresyl ester melts at 65 to 66° C. Saponification number: 248.5 (calculated as 249).

*Example XII*

300 parts by weight of p-toluic acid methyl ester (2 mol) and 375 parts by weight of a 4-tert-butylphenol (2.5 mol) are transesterified with the addition of 3 parts by weight of tin stearate (1%, based on the amount of ester), as described in Example 1. The boiling temperature in the reaction flask rises from initially about 230° C. to 270° C. after 20 hours. After this time, about 90% of the calculated methanol amount is condensed in the receiver. After distillation of the excess butylphenol and a small amount of unreacted p-toluic acid methyl ester, 476 parts by weight of p-toluic acid-4-tert-butylphenyl ester distill at 216 to 219° C. at 15 torr, corresponding to a theoretical yield of 89%, based on the amount of toluic acid methyl ester employed, or 98%, based on the amount of ester reacted. The toluic acid butyl phenyl ester melts at 75° to 76° C. The saponification number is 210 (calculated as 210).

*Example XIII*

63.3 parts by weight of dibromobenzoic acid methyl ester (0.215 mol) and 35 parts by weight of o-cresol (0.325 mol) are transesterified with the addition of 0.3 parts by weight of tin stearate at 200° C. After 12 hours, 6 parts by weight of methanol, corresponding to 87% of the calculated amount, are condensed in the receiver. After distillation of the excess cresol and a small amount of unreacted dibromobenzoic acid methyl ester, the main amount of the dibromobenzoic acid-o-cresyl ester distills from 180 to 190° C. at 0.6 torr. 65 parts by weight are obtained, corresponding to 82% of the theoretical yield. The saponification number is 150 (calculated as 152).

*Example XIV*

194 parts by weight of dimethyl terephthalate (1 mol) and 515 parts by weight of technical octylphenol (2.5 mol) are transesterified with the addition of 0.48 parts by weight of tin stearate (0.25%, based on the amount of DMT), as described above. The reaction temperature is maintained at 280 to 290° C. After 16 hours, 57 parts by weight of methanol, corresponding to 89% of the calculated amount, are condensed in the receiver. During distillation of the excess octylphenol, 116 parts by weight are recovered. Accordingly, 399 parts by weight, i.e. 97% of the theoretical amount, are consumed for the transesterification reaction. There remain 526 parts by weight of crude di-octyl-phenyl terephthalate, corresponding to 97% of the theoretical yield. Saponification number: 210 (calculated as 208). After recrystallization from xylene, the product melts at 180 to 183° C.

*Example XV*

291 parts by weight of dimethyl terephthalate (1.5 mol) are transesterified with 456 parts by weight of a technical 2.4/2.5-dimethylphenol fraction (3.75 mol)

with the addition of 1.45 parts by weight of tin stearate (0.5%, based on the amount of DMT) for 25 hours, as described above. 86.5 parts by weight, corresponding to 90% of the calculated methanol amount, are condensed. By distillation in vacuo, 95 parts by weight of xylenol are recovered. Accordingly, 361 parts by weight, i.e. 99% of the calculated xylenol amount, are consumed for the transesterification. There remain 555 parts by weight of crude dimethylphenyl ester of terephthalic acid with a saponification number of 305 (calculated as 301). The crude ester thus still contains a small amount of methylxylenyl ester. The crude ester displays as an isomeric mixture a melting point interval of about 100 to 150° C. During recrystallization from xylene, 282 parts by weight of a portion melting uniformly at 160 to 162° C. are obtained as the most difficultly soluble constituent. The saponification number is 300.5 (calculated as 301).

*Example XVI*

267 parts by weight of dimethyl terephthalate (1.38 mol) and 495 parts by weight of β-naphthol (3.45 mol) are transesterified with the addition of 2.6 parts by weight of tin stearate at 280 to 300° C. The reaction is completed after 14 hours. After distillation of 114 parts by weight of excess β-naphthol, there remain 560 parts by weight of crude di-β-naphthyl terephthalate, corresponding to 97% of the theoretical yield. After recrystallization from xylene, the ester melts at 230 to 232° C. The saponification number is 270 (calculated as 268.5).

*Example XVII*

194 parts by weight of dimethyl terephthalate (1 mol) and 460 parts by weight of p-benzylphenol (2.5 mol) are transesterified with the addition of 0.95 part by weight of tin stearate at 250 to 280° C., until, after 25 hours, about 95% of the calculated methanol amount are condensed in the receiver. After distillation of the excess benzylphenol in vacuo and recrystallization of the residue from xylene, 460 g. of dibenzyl-phenyl-terephthalate are obtained, corresponding to 92% of the theoretical yield. Melting point: 165 to 167° C. The saponification number is 224 (calculated as 225).

*Example XVIII*

388 parts by weight of dimethyl terephthalate (2 mol) and 300 parts by weight of 4-tert-butylphenol (2 mol) are transesterified with the addition of 1.94 parts by weight of tin stearate. The temperature in the reaction vessel rises from initially 240 to 290° C. after 8 hours reaction time. By that time, 57 parts by weight of methanol have condensed in the receiver, that is, 89° of the amount calculated for the transesterification of a methyl group of the dimethyl terephthalate. During the distillation, 111.5 parts by weight of dimethyl terephthalate and 24.5 parts by weight of unreacted butylphenol are first recovered. 320 parts by weight of methyl-4-tert-butylphenyl terephthalate then distill at 220 to 225° C. at 0.8 torr, which melt at 88 to 89° C. after recrystallization from gasoline and show the saponification number of 359 (calculated as 361). The crystalline distillation residue consists of 150 parts by weight of di-4-butylphenyl terephthalate which, after recrystallization from xylene, melts at 224 to 225° C. The saponification number is 261.5 (calculated as 262).

*Example XIX*

312 parts by weight of methylterephthalic acid dimethyl ester (1.5 mol) and 405 parts by weight of o-cresol (3.75 mol) and are transesterified with the addition of 1.56 parts by weight of tin stearate for 29 hours. The reaction temperature rises thereby from 198 to about 230° C. After distillation of the excess cresol and a small amount of unreacted methylterephthalic acid dimethyl ester, 109 parts by weight of methylterephthalic acid methyl-o-cresyl ester distill at 230° C. at 15 torr with the saponification number of 393 (calculated at 396). Subsequently, 364 parts by weight of methylterephthalic acid di-o-cresyl ester distill from 232 to 236° C. at 0.4 torr which, after recrystallization from a small amount of xylene, melts at 80 to 82° C. The saponification number is 312.2 (calculated as 312).

*Example XX*

369 parts by weight of 3-chloro-4-methyl-benzoic acid methyl ester (2 mol) and 552 parts by weight of p-benzylphenol (3 mol) are transesterified with the addition of 1.85 parts by weight of tin stearate at 260 to 300° C. for 18 hours. After distillation of the excess benzylphenol and 50 parts by weight of methyl ester which was not transesterified, 569 parts by weight of 3-chloro-4-methylbenzoic acid p-benzylphenyl ester distill as a viscous oil at 235 to 239° C. at 0.4 torr. The saponification number is 169 (calculated as 167.5). This corresponds to a yield of 85%, based on the amount of methyl ester employed and, respectively, 98%, based on the amount of methyl ester reacted.

The invention being thus described, it will be obvious that the same may be varied in many ways. Such variations are not to be regarded as a departure from the spirit and scope of the invention, and all such modifications are intended to be included within the scope of the following claims.

We claim:
1. A process for the preparation of an aryl ester of an acid selected from the group consisting of carbocyclic aromatic mono- and polycarboxylic acids and halo- and alkyl-substituted derivatives thereof which comprises heating the methyl ester of said acid in the presence of an acidic, alkaline or metallic salt transesterification catalyst with at least an equivalent amount of a phenolic component to a temperature between approximately 180° and 250° C., said phenolic component being selected from the group consisting of phenol, naphthol and substituted phenols and naphthols, said substituted phenols and naphthols being substituted by one or more groups selected from the group consisting of the alkyl and aralkyl radicals, and continuously removing the methyl alcohol formed by the reaction between said methyl ester and phenolic component from the reaction mixture.

2. A process for the preparation of an aryl ester of an acid selected from the group consisting of carbocyclic aromatic mono- and polycarboxylic acids and halo- and alkyl-substituted derivatives thereof which comprises heating the methyl ester of said acid in the presence of an acidic, alkaline or metallic salt transesterification catalyst with at least an equivalent amount of a phenolic component to a temperature above 160° C., said phenolic component being selected from the group consisting of phenol, naphthol, and substituted phenols and naphthols, said substituted phenols and naphthols being substituted by one or more groups selected from the group consisting of the alkyl and aralkyl radicals, and continuously removing the resulting methyl alcohol formed from the reaction mixture.

3. A process as defined in claim 2, wherein said catalyst is a fatty acid salt of a metal of the second group of the Periodic System.

4. A process as defined in claim 3, wherein said fatty acid salt is selected from the group consisting of calcium stearate and the zinc salt of the preliminary run coconut fatty acids.

5. A process as defined in claim 2, wherein said catalyst is a fatty acid salt of tin.

6. A process as defined in claim 2, wherein 2 to 6 moles of said phenolic component are used per each methyl ester group to thereby obtain a quantitative transesterification.

7. A process for the preparation of a methylphenyl ester of an acid selected from the group consisting of carbocyclic aromatic di- and polycarboxylic acids and halo- and alkyl-substituted derivatives thereof which comprises heating the methyl ester of said acid in the presence of an acidic, alkaline or metallic salt transesterification catalyst with between 1 and 2 moles of a phenolic component for each methyl group to be exchanged to a temperature above 160° C., said phenolic component being selected from the group consisting of phenol, naphthol, and substituted phenols and naphthols, said substituted phenols and naphthols being substituted by one or more groups selected from the group consisting of the alkyl and aralkyl radicals, continuously removing the calculated amount of resulting methyl alcohol from the reaction mixture, and separating the resulting methylphenyl ester.

8. A process for the preparation of a phenyl ester of an acid selected from the group consisting of carbocyclic aromatic mono- and polycarboxylic acids and halo- and alkyl-substituted derivatives thereof which comprises heating the methyl ester of said acid in the presence of an acidic, alkaline or metallic salt transesterification catalyst with at least an equivalent amount of phenol at a temperature between approximately 180° and 250° C. and continuously removing the methyl alcohol formed by the reaction between said methyl ester and phenol from the reaction mixture.

9. A process as defined in claim 8, wherein said catalyst is selected from the group consisting of polyphosphoric acid, alkali metal hydroxides, butyl titanate, calcium stearate, tin stearate and the zinc salt of the preliminary run coconut fatty acids.

10. A process as defined in claim 9, wherein said methyl ester is dimethyl terephthalate.

References Cited
UNITED STATES PATENTS
3,012,049  12/1961  Bill _____ 260—410.9

FOREIGN PATENTS
810,381  3/1959  Great Britain.

OTHER REFERENCES
Wilfong, J. Polymer Science, vol. 54, pp. 388, 389, 1961.

LORRAINE A. WEINBERGER, *Primary Examiner.*
T. L. GALLOWAY, *Assistant Examiner.*